UNITED STATES PATENT OFFICE.

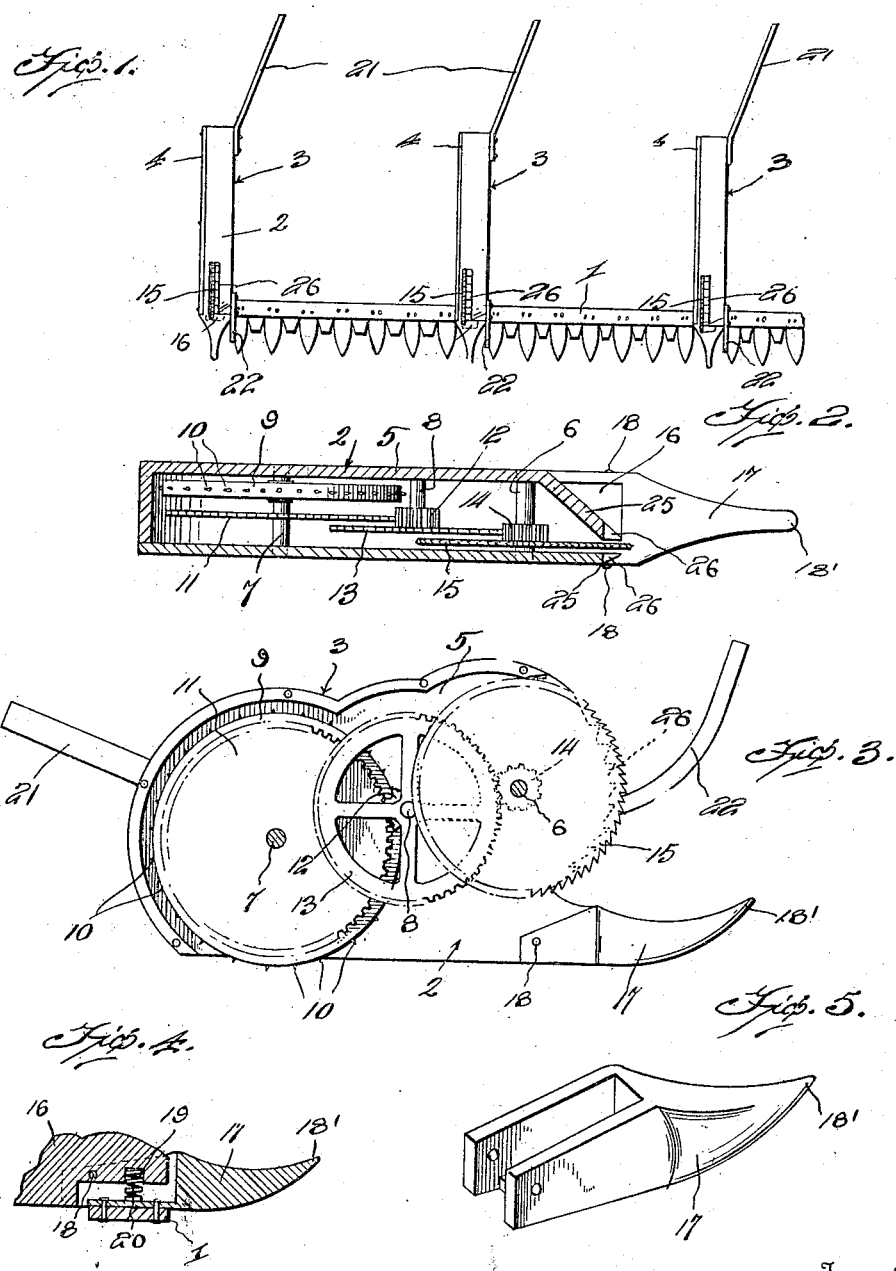

EDMOND A. SALTER, OF PROVENCAL, LOUISIANA.

VINE-CUTTER.

1,197,550.

Specification of Letters Patent.   Patented Sept. 5, 1916.

Application filed February 4, 1916. Serial No. 76,197.

*To all whom it may concern:*

Be it known that I, EDMOND A. SALTER, a citizen of the United States, residing at Provencal, in the parish of Natchitoches and State of Louisiana, have invented certain new and useful Improvements in Vine-Cutters; and I do hereby declare the following to be a full, clear, and exact description of the invention, such as will enable others skilled in the art to which it appertains to make and use the same.

This invention relates to a vine cutter which is adaptable for attachment to the cutter bar of any ordinary mowing machine, and for cutting pea vines, for hay, and the primary object of the invention is to provide a cutter as specified, which will cut the pea vines into relatively short lengths, for facilitating the handling thereof.

Another object of this invention is to provide a vine cutter as specified, which includes a rotary saw for cutting the vines into relatively short lengths, and a ground wheel, which is rotated by the travel of the mowing machine, for rotating the saw.

A further object of this invention is to provide a pivotally mounted, spring controlled shoe which is positioned forwardly of the rotary saw for guiding the vines thereto.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of a fragment of a mowing machine showing the improved vine cutter applied thereto. Fig. 2 is a cross sectional view through the vine cutter. Fig. 3 is a vertical section through the vine cutter. Fig. 4 is a detail sectional view through the pivotally mounted spring controlled shoe, and Fig. 5 is a detail perspective view of the pivoted guide guard.

Referring more particularly to the drawings, 1 designates the cutter bar of a mowing machine of ordinary construction, which has the improved vine cutter, generically indicated by the numeral 2 attached thereto. If it is so desired, any number of the vine cutters may be attached to the cutter bar, at spaced intervals along the length of the same, for cutting the pea vines in relatively short lengths or if it is desired, only one of the cutters may be attached to the outer end of the cutter bar structure 1, of the mowing machine, this feature being left to the desire of the person operating the device.

The vine cutter structure 2, includes a housing 3, which has its outer side closed by a detachable closure plate 4. The side 5 of the housing 3 and the closure plate 4 form supports for shafts 6 and 7, and the side 5, further forms a support for a stub shaft 8. The shaft 7 has a ground or supporting wheel 9 mounted thereon, which has a plurality of spurs 10 attached to the periphery of the same for biting into the ground during the travel of the mowing machine. The shaft 7 has a gear 11 mounted thereon which gear is rotated by the rotation of the shaft occasioned by the rotation of the ground wheel 9. The gear 11 meshes with a pinion 12, which is mounted upon the stub shaft 8. The pinion 12 is secured to one side of a gear 13, which gear meshes with a pinion 14. The pinion 14 is mounted upon the shaft 6 and is attached to one side of the rotary vine cutting saw 15 which provides means for the rotation of the saw by the rotation of the ground wheel 9.

The lower forward corner of the side 5 of the casing 3 is provided with a forwardly projecting extension 16, which is pivotally connected to a shoe 17 as is shown at 18. The shoe 17 has an outwardly extending upwardly curved point 18' which is provided for engaging the pea vines and guiding them to the saw 15, so that they will be properly cut during the operation of the vine cutter. The extension 16 is provided with a recess 19, in which a cushioning spring 20 is seated. The spring 20 engages the upper portion of the recessed end of the shoe 17 as clearly shown in Fig. 4 of the drawings. The shoe 17 is connected to the cutter bar 1, which permits of a pivotal movement of the casing 3 and the parts carried thereby, independent of the movement of the cutter bar.

In applying or attaching the vine cutter to the outer end of the mowing machine cutter bar, the ordinary guiding board of the mowing machine is removed and the improved vine cutter attached to the cutter bar in lieu thereof.

The casing 3 has a rearwardly extending divider board 21 connected thereto and extending rearwardly therefrom for throwing the cut vines to one side of the end of the swath, for permitting of the unimpeded return of the mowing machine. An arcuate finger 22 is attached to the casing 3 and curved upwardly from the forward end of the same. The finger 22 is provided for guiding vines downwardly to the saw, to insure the proper cutting of all the vines. The corners of the forward end of the housing 3 through which the saw 15 protrudes are beveled as clearly shown at 25 in Fig. 2 of the drawings and the portions of this front side, which are positioned upon the sides of the saw are provided with vine supporting shoulders 26 for coaction with the saw in cutting vines.

In the operation of the improved vine cutter; the vine cutter being attached to the cutter bar of a mowing machine, will cut the vines, such as pea vines or the like in relatively short lengths, and thereby facilitate the handling of the hay as well as preventing the tangling of the vines among the parts of the mowing machine. The cutter which is positioned at the end of the cutter bar structure will cut the portions of the vines which extend over from alongside of the swath, into the swath or the path of the mowing machine, thereby eliminating one of the most inconvenient conditions consistent with the cutting of pea vines for hay.

The vines are cut from their roots by the ordinary cutter bar structure of the mowing machine and are guided to the various saws 15, when more than one of the vine cutters is attached to the cutter bar, which saws cut them in relatively short lengths. The saws 15 are rotated by the travel of the mowing machine, through the medium of the gears and pinions 11, 12, 13 and 14 and the rotation of the ground wheel 9 as heretofore described.

From the foregoing description taken in connection with the accompanying drawings the advantages of construction and of the method of operation of the improved vine cutter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a vine cutter structure, the combination of a casing adapted for attachment to the cutter bar of an ordinary mowing machine, a rotary saw carried by said casing, means for rotating said saw, a spring controlled shoe pivotally connected to said casing for guiding vines through said rotary saw.

2. In a vine cutter structure, the combination of a casing adapted for attachment to the cutter bar of an ordinary mowing machine, a rotary saw carried by said casing, means for rotating said saw, a spring controlled shoe pivotally connected to said casing for guiding vines through said rotary saw, an upwardly curved finger carried by said casing for guiding vines downwardly to said saw.

3. In a vine cutter structure, the combination of a casing adapted for attachment to the cutter bar of an ordinary mowing machine, a rotary saw carried by said casing, means for rotating said saw, a spring controlled shoe pivotally connected to said casing for guiding vines through said rotary saw, an upwardly curved finger carried by said casing for guiding vines downwardly to said saw, and a rearwardly extending divider board connected to said casing.

In testimony whereof I affix my signature in presence of two witnesses.

EDMOND A. SALTER.

Witnesses:
D. C. DALE,
L. T. HAWTHORNE.

Copies of this patent may be obtained for five cents each, by addressing the "Commissioner of Patents, Washington, D. C."